July 23, 1935.   J. H. HAMMOND, JR   2,008,712
SOUND REPRODUCING SYSTEM
Filed Dec. 21, 1933   2 Sheets-Sheet 1
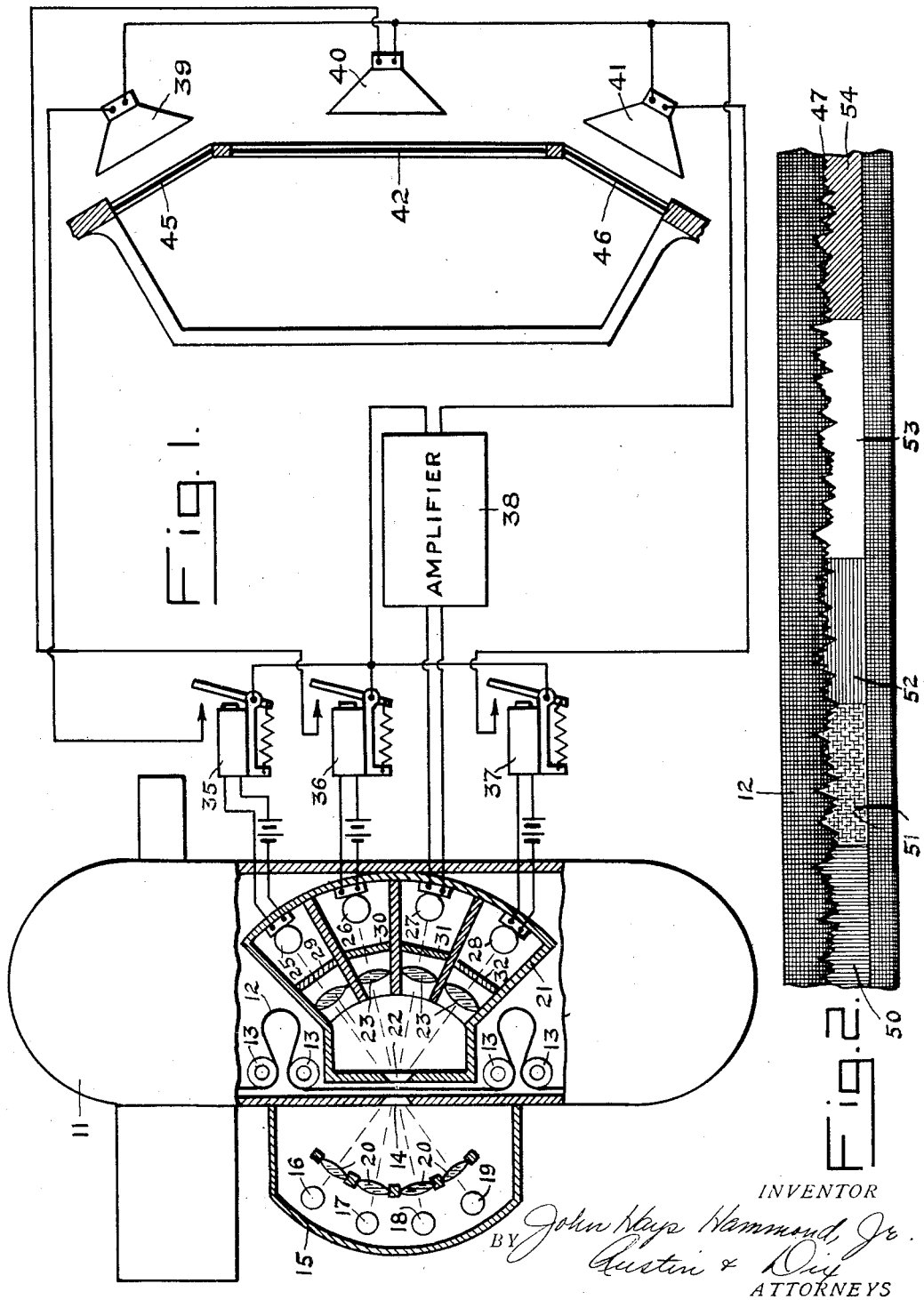

July 23, 1935.  J. H. HAMMOND, JR  2,008,712
SOUND REPRODUCING SYSTEM
Filed Dec. 21, 1933   2 Sheets-Sheet 2
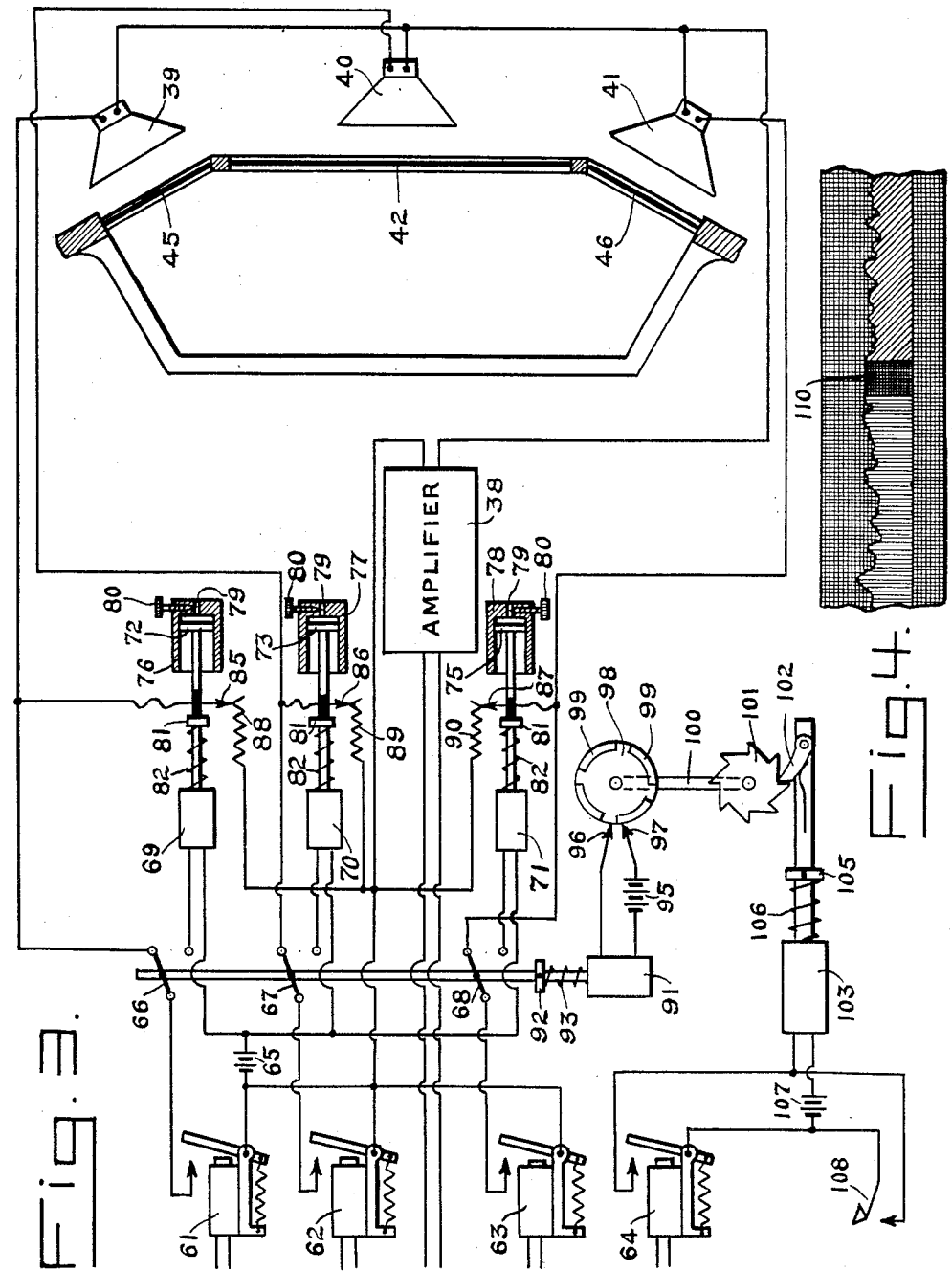
INVENTOR
BY John Hays Hammond, Jr
Austin & Dix
ATTORNEYS

UNITED STATES PATENT OFFICE 2,008,712

SOUND REPRODUCING SYSTEM

John Hays Hammond, Jr., Gloucester, Mass.

Application December 21, 1933, Serial No. 703,340

10 Claims. (Cl. 179—100.3)

This invention relates to sound reproducing systems and more particularly to a control system for sound propagating devices.

The invention relates more specifically to a plurality of sound propagating devices fed by a sound record and control means for variably proportioning the output of said devices.

According to the one form of the invention the sound reproducing system may be used in conjunction with the projection of motion pictures where the sound propagating devices are distributed near the projecting screen. The relative output of the sound propagating devices may be varied by change in the characteristics of the sound record, such as by change in the color of the sound track of a motion picture film. Thus, the apparent origin of the sound may be associated with different parts of the screen.

In some cases the output intensity of the sound propagating devices may be varied gradually in such a manner that the source of sound appears to travel gradually from one part of the screen to another.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 illustrates diagrammatically one form of the invention as applied to the projection of talking motion pictures.

Fig. 2 is a section of film showing the sound record recorded thereon.

Fig. 3 illustrates diagrammatically a modified form of the invention, and

Fig. 4 is a section of film used in the modified form of the invention shown in Fig. 3.

Like reference characters denote like parts in the several figures of the drawings.

In the following description and in the claims, parts will be identified by specific names for convenience, but they are intended to be as generic in their application to similar parts as the art will permit.

Referring to the accompanying drawings and more particularly to Fig. 1, a moving picture projector is shown at 11 which is provided with a film 12 which passes over rollers 13. This film is fed at a uniform speed past a narrow slit 14 provided in the casing of the projector 11. Mounted in front of this slit is a casing 15 in which is mounted a plurality of sources of illumination 16, 17, 18 and 19. Between each of these and the slit 14 is mounted a lens 20 for focusing the light upon the film 12.

Mounted inside the projector 11 is a casing 21 provided with a slit 22 located opposite the slit 14. Mounted in this casing are four lenses 23 which focus the light from the lamps 16 to 19 upon four photo-electric cells 25 to 28. Between the lenses and the photo-electric cells are mounted four color filters 29 to 32. The filters 29, 30 and 32 allow only the passage of red, yellow and blue light, respectively. The filter 31 allows the passage of all colors of light but is made in any well-known manner to transmit light of any of the above colors equally well.

The three photo-electric cells 25, 26 and 28 are connected in the energizing circuits of relays 35, 36 and 37 and the photo-electric cell 27 is connected in the input circuit of an amplifier 38. The output circuit of this amplifier is connected to three loud speaking units 39, 40 and 41. The circuits to these units are controlled by the relays 35, 36 and 37, respectively.

The three loud speaking units 39, 40 and 41 are located behind the moving picture screen 42, the unit 40 being behind the center of the screen and the units 39 and 41 being located behind wings 45 and 46 to the left and right of the screen respectively, wings 45 and 46 are screens of gauze or other suitable sound transmitting materials which are mounted adjacent to the moving picture screen 42.

The sound track of the film 12 is illustrated in Fig. 2. In this the sound record 47 is of the usual type of variable area record. Each portion of the sound track which includes the sound record produced from a given source is to transmit only a desired color. For example, if the sound is produced from a source shown at the left hand side of the picture the track will be colored red as shown at 50; if it is produced from a source in the central portion of the picture the track will be colored yellow as shown at 51; and if it is produced from a source at the right hand side of the picture it will be colored blue as shown at 52. If the source of sound comes from the entire picture such as might be the case in a mob scene, for example, the track is colorless and transparent as shown at 53; and if the source of sound is from the right central portion of the screen the track is colored green as shown at 54.

As this film record is run between the slits 14 and 22 light from the four lamps 16 to 19 will pass through the sound track and be focused by the lenses 23 upon the photo-electric cells 25 to 28. If the track is colored red as shown at 50 only red light will be transmitted through the film and this light will pass only through the filters 29 and 31, thus illuminating only the photo-electric cells 25 and 27. Light falling on cell 25 will decrease its resistance thus allowing the battery to energize relay 35. Relay 35, on energization closes the circuit from amplifier 38 to the loud speaking unit 39. The energy from the photo-electric cell 27 will be amplified by the amplifier 38, the output of which will then pass to the loud speaker 39 where the speech or music will be reproduced. This will cause the sound to issue from the left hand side of the picture which corresponds to the side from which the source of sound is shown to be produced in the accompanying motion picture.

When the portion of the sound track marked 51 comes opposite the slits 14 and 22 only yellow light will be transmitted through the film, thus only affecting the photo-electric cells 26 and 27. This will cause the energization of the relay 36 which will connect the loud speaking unit 40 to the amplifier thus causing the sound to issue from the center of the picture.

In a similar manner when the blue portion 52 of the film comes opposite the slits 14 and 22 the sound will be produced by the loud speaking unit 41 thus causing it to issue from the right hand side of the picture. When the transparent portion 53 of the film comes opposite the slits 14 and 22 the cells 25 to 28 will all be illuminated. Thus the relays 35, 36 and 37 will all be energized and will close the circuits to the three loud speaking units 39, 40 and 41. Energy from the cell 27 will then be amplified by the amplifier 38 and fed to the three units 39, 40 and 41 where it will be reproduced as speech or music thus causing a large volume of sound to issue from all three parts of the screen.

When the green portion 54 of the film comes opposite the slits 14 and 22 the frequencies of both the blue and yellow light will be transmitted and the cells 26, 27 and 28 will be illuminated thus energizing the relays 36 and 37 which will cause the speech or music to be reproduced by the units 40 and 41 to give the effect of sound issuing from the right central portion of the screen. In a similar manner an orange section in the sound track would transmit both red and yellow light to actuate reproducing units 39 and 40 simultaneously.

In this way it is seen that by coloring portions of the sound track the proper colors the sound may be caused to issue from any desired part of the screen corresponding to the position of the source of sound as shown on the screen by the moving picture. This gives a stereo-acoustic effect.

In some cases it may be desirable for the sound to appear to move gradually across the screen. This might be desirable in exhibiting pictures of a moving train, for example, in this event the mechanism comprising the modified form of the invention illustrated in Figs. 3 and 4 may be used. In this form of the invention the projector is similar to that shown in Fig. 1 except that five sources of illumination and five photo-electric cells are used instead of the four shown in this figure. The fifth source of illumination is especially strong in infra-red rays, such as would be an element heated to red heat. A filter is placed in front of the fifth photo-electric cell which permits the passage of infra-red rays only and is opaque as to visible light. Such a filter may be made of vulcanite, bromine, iodine, et cetera. The fifth photo-electric cell may be of special construction, so as to be especially sensitive to infra-red radiation, such, for example, as the cell using oxidized thallium sulphide, which is described on pages 134–135 of "Photo-cells and Their Application" by Zworykin and Wilson (John Wiley and Sons, New York, 1932). The lenses used in the fifth optical system are made of substances suitable for transmitting infra-red rays, such, for example, as rock salt, flourite or Jena glass.

The five photo-electric cells are connected to four relays 61 to 64 and to the amplifier 38. One side of the output of this amplifier is connected to the three loud speaking units 39, 40 and 41 which are mounted behind the screens 45, 42 and 46 as already described in connection with Fig. 1. The other side of the output of the amplifier 38 is connected to the armatures of the three relays 61, 62 and 63, and to one side of a battery 65. The contacts of the relays 61, 62 and 63 connected to the blades of three switches 66, 67 and 68. The upper contacts of these switches are connected to the three loud speaking units 39, 40 and 41 respectively. The lower contacts of these switches are connected to the windings of three solenoids 69, 70 and 71. The other side of the windings of these solenoids are connected to the battery 65. Secured to the distal ends of the core armatures of the solenoids 69, 70 and 71 are three pistons 72, 73 and 75 which are adapted to travel in three cylinders or dashpots 76, 77 and 78. These cylinders are provided with ports 79, which are controlled by needle valves 80. Secured to the cores of the solenoids 69, 70 and 71 are collars 81. Compression springs 82 are disposed on the cores between these collars 81 and the solenoids.

Mounted on, but insulated from the cores of the solenoids 69, 70 and 71 are three contacts 85, 86 and 87 which are connected to the three loud speaking units 39, 40 and 41, respectively. These contacts engage resistances 88, 89 and 90, respectively, which are connected to the output of the amplifier 38.

The blades of the switches 66, 67 and 68 are insulated from each other and are controlled by the core armature of a solenoid 91. To this core is secured a collar 92. Between collar 92 and the solenoid is disposed a compression spring 93. The winding of the solenoid 91 is connected through a battery 95 to two contacts 96 and 97 which engage a commutator 98 which is made of insulated material. Mounted on the periphery of the commutator 98 are four conducting segments 99.

The commutator 98 is mounted on a shaft 100 to which is attached a ratchet 101. Engaging this ratchet is a spring pressed pawl 102 which is mounted on the core armature of a solenoid 103. Secured to this core is a collar 105. Between collar 105 and the solenoid is mounted compression spring 106. One side of the winding of the solenoid 103 is connected to a battery 107, the other side of which is connected to the armature of the relay 64. The other side of the winding of the solenoid 103 is connected to the contact of the relay 64. A key 108 is connected across the contacts of relay 64.

The film used in the modified form of the invention shown in Fig. 3 is depicted in Fig. 4 and is similar to the film shown in Fig. 2 except that it is covered on one side with a very thin film of metallic silver. This prevents the transmission of infra-red radiations but allows visible light to be transmitted freely. At certain places such as at 110 in Fig. 4 this film of silver is not present but instead the film is blackened with a material which will prevent transmission of visible light but which will transmit infra-red radiations freely.

In the operation of the modified form of the invention shown in Figs. 3 and 4, the sound track shown in Fig. 4 is run between the slits 14 and 22 as already described and radiation from the five lamps will pass through this record and be focused upon the five photo-electric cells.

The operation of the system is similar to that already described so that when a red portion of the sound track passes between the slits the relay 61 will be energized thus throwing the loud speaking unit 39 into operation. When a yellow portion of the sound track comes between the slits, the relay 62 will be energized thus connecting the loud speaking unit 40 to the output of the amplifier 38 and when a blue portion of film passes between the slits the relay 63 will be energized thus making the loud speaking unit 41 operative.

The operation of these loud speaking units will be identical with those described in connection with Figs. 1 and 2.

When it is desired to cause a gradual motion of the source of sound from one part of the screen to another, a black segment such as 110 in Fig. 4 is inserted in the sound track and the film of metallic silver is omitted from the track at this place, so that when this segment comes between the slits only infra-red radiation from the fifth source will pass through the film. This will energize only the fifth photo-electric cell which as already stated is sensitive to this type of radiation. This will cause the energization of the relay 64 which in turn energizes the solenoid 103 causing the core of this solenoid to be moved to the left, as shown in Fig. 3, which will rotate the ratchet 101 and the commutator 98 through an eighth of a revolution thus bringing one of the conducting segments 99 into engagement with both the contacts 96 and 97. This will close the circuit through the solenoid 91 thus causing its core to be moved downwardly which throws the three switches 66, 67 and 68 into their lower positions thus connecting the solenoids 69, 70 and 71 to the relays 61, 62 and 63.

This action occurs so rapidly that it does not interfere with the reproduction from the sound record on the film as this film continues to move past the slits. The photo-electric cells will be energized by the different colors of the film as already described. Thus, for example, if the film is colored red the relay 61 will be energized which will cause the energization of the solenoid 69. The core of this solenoid will then move gradually to the left, the speed of its motion being determined by the adjustment of the needle valve 80 which allows air to slowly enter the right hand end of the cylinder 76. As this occurs, the contact 85 will be slowly moved to the left across the resistance 88.

Resistance 88 is normally so great that no energy will be fed to the loud speaker 39. As the contact 85 moves across resistance 88, however, it will be gradually cut out of the circuit thus allowing more and more energy from the amplifier 38 to be fed to the loud speaking unit 39 until maximum input is reached when the contact 85 reaches the left hand end of the resistance. Hereafter the maximum energy will continue to reach loud speaker 39 as long as the film track is colored red. If the color should change to yellow the relay 61 will be de-energized and the relay 62 be energized thereby de-energizing the solenoid 69 and energizing the solenoid 70. This will cause the contact 85 to be moved slowly to the right and the contact 86 to be moved slowly to the left. As this action proceeds, the energy fed to the loud speaker 39 will be decreased and the energy fed to the loud speaker 40 will be increased.

This will thus cause the source of sound to appear to gradually move from the left hand side of the screen to the center, thus causing the sound to appear to follow the action on the screen from place to place.

If it is desired to have the source of sound appear to travel across the screen from left to right, the sound track is first colored red, then yellow and then blue which will cause the sound to gradually increase to a maximum at the left and then travel across the screen at substantially uniform intensity to the right where it will gradually disappear. When it is desired to return to the individual operation of loud speaking units, another segment similar to 110 is provided on the sound track which will cause the energization of the relay 64 thus rotating the commutator 98 into a position similar to that shown on Fig. 3. This will cause the de-energization of the solenoid 91 which will allow the core of this solenoid to be moved upwardly under the action of the spring 93, thus moving the three switches 66, 67 and 68 into their upper positions. The operation of the mechanism will then be similar to that already described in connection with Fig. 1.

The key 108 is provided in order that the operator may control the positions of the switches 66, 67 and 68 manually if desired. Thus in case the mechanism should get out of step for any reason it can be quickly brought back into step by operation of this key.

A system has thus been produced, according to the above form of the invention, whereby sounds may be made to issue from various sections of a motion picture screen to follow the apparent source of sound visibly displayed on the screen. According to the modified form of the invention, the sounds may be made to move gradually over the screen from one part to another. The passage of moving objects, such as vehicles or bands in a parade, across the picture from one portion to another is thus accurately simulated.

Although only a few of the various forms in which this invention may be embodied have been shown herein, it is to be understood that the invention is not limited to any specific construction, but might be embodied in various forms without departing from the spirit of the invention or the scope of the appended claims.

What is claimed is:

1. In a sound reproducing system, a photographic film having a sound track thereon, said track comprising portions of different colors, a plurality of sound reproducing devices, light sensitive devices controlled by the color of said track and control means operated by said light sensitive devices for making any of said sound reproducing devices operative.

2. In a sound reproducing system, a photographic film having a sound track thereon, said track comprising portions printed in different colors, a pick-up cell sensitive to all of said colors, an amplifier connected to said cell for amplifying the energy therefrom, a plurality of sound reproducing devices fed by said amplifier, a separate pick-up cell for each color printed on said record and control devices operated by each of said pick-up cells for controlling each of said sound reproducing devices.

3. In a system for producing sound from a sound record, a photographic film having a sound track thereon printed in a plurality of different colors, an individual pick-up cell for each color, a common pick-up cell sensitive to all of said colors, a plurality of sound reproducers fed by said common cell and a control device operated by each of said other cells, said control devices causing different sound reproducers to become operative responsive to different colors.

4. In a sound reproducing system, a sound record, a plurality of spaced sound propagating devices adapted to receive energy therefrom, means responsive to a characteristic of said sound record for selectively actuating said devices and delay means controlled by another characteristic of said record for retarding the rate of change of sound energy in said devices.

5. In a sound reproducing system, a sound record, a plurality of sound propagating devices distributed in space adapted to receive energy therefrom, means responsive to a characteristic of said sound record for selectively actuating said devices and delay means controlled by another characteristic of said record for retarding the increase and decrease of sound energy in said devices as they are selectively actuated whereby the point of emission of reproduced sound may be gradually varied.

6. In a sound reproducing system for talking motion pictures, a film having a sound record thereon, a plurality of sound propagating devices distributed in space and fed by said sound record, and time-delay relay means controlled by a characteristic of said record for gradually reducing the transmission of sound energy from said record to a first of said devices and simultaneously gradually increasing the transmission of sound energy from said record to a second of said devices whereby the point of emission of the reproduced sound may gradually be varied.

7. In a system for reproducing sound, a film having a sound track, a sound record on said track, said track being divided into differently colored areas serially distributed longitudinally of said film, a plurality of sound propagating devices to be selectively fed from said sound record and means responsive to the color of said track for selectively actuating said devices.

8. In a system for reproducing sound, a film having a sound track, a sound record on said track, said track being divided into differently colored areas serially distributed along said film, means for scanning said film and picking up the variations of said sound record, a plurality of sound propagating devices distributed in space, individual relays to selectively connect said devices to receive said variations, and means responsive to the color of the film area being scanned for selectively actuating said relays.

9. In a system for reproducing sound, a film having a sound track, a sound record on said track, said track being divided into successive sections distributed along said film, said sections being differently colored to selectively transmit specific color frequencies, a plurality of sound propagating devices to be selectively fed from said sound record, means responsive to the color of said sound track for selectively actuating said devices, said means being adapted to simultaneously actuate a plurality of said devices in response to the transmission of a corresponding plurality of colors by said sound track.

10. In a system for reproducing sound from a sound record, a pick-up system, a plurality of sound propagating devices, relays responsive to a characteristic of the sound record for instantaneously and selectively connecting said devices to said pick-up system, delay means for gradually connecting said devices to said pick-up system, and selective means responsive to control variations on said record for rendering said relays or said delay means operative for connecting said devices either simultaneously or gradually.

JOHN HAYS HAMMOND, Jr.